(12) United States Patent
Takahashi et al.

(10) Patent No.: US 11,383,208 B2
(45) Date of Patent: Jul. 12, 2022

(54) GAS SEPARATION MEMBRANE, GAS SEPARATION MEMBRANE ELEMENT, AND GAS SEPARATION METHOD

(71) Applicant: TORAY INDUSTRIES, INC., Tokyo (JP)

(72) Inventors: Rina Takahashi, Shiga (JP); Kazuki Sato, Shiga (JP); Masakazu Koiwa, Shiga (JP); Shuji Furuno, Shiga (JP); Takao Sasaki, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 219 days.

(21) Appl. No.: 16/771,314

(22) PCT Filed: Dec. 26, 2018

(86) PCT No.: PCT/JP2018/047910
§ 371 (c)(1),
(2) Date: Jun. 10, 2020

(87) PCT Pub. No.: WO2019/131786
PCT Pub. Date: Jul. 4, 2019

(65) Prior Publication Data
US 2020/0338506 A1 Oct. 29, 2020

(30) Foreign Application Priority Data

Dec. 26, 2017 (JP) .............................. JP2017-248897
Mar. 30, 2018 (JP) .............................. JP2018-067917

(51) Int. Cl.
*B01D 53/22* (2006.01)
*B01D 71/56* (2006.01)
(Continued)

(52) U.S. Cl.
CPC ............. *B01D 71/56* (2013.01); *B01D 63/10* (2013.01); *B01D 69/10* (2013.01); *B01D 69/12* (2013.01); *B01D 2325/02* (2013.01)

(58) Field of Classification Search
CPC ........ B01D 69/12; B01D 69/10; B01D 71/56; B01D 63/10; B01D 2325/02
See application file for complete search history.

(56) References Cited

U.S. PATENT DOCUMENTS 5,049,169 A * 9/1991 Teramoto ............... C08G 75/23
96/14
5,789,024 A * 8/1998 Levy ...................... B01D 71/02
427/244

(Continued)

FOREIGN PATENT DOCUMENTS

CN 101910314 A 12/2010
CN 104379241 A 2/2015
(Continued)

OTHER PUBLICATIONS

Chen et al., "Preparation and characterization of a novel thermally stable thin fim composite nanofiltration membrane with poly (m-phenyleneisophthalamide) (PMIA) substrate," Journal of Membrane Science, vol. 550, 2018, pp. 36-44, 9 pages total.

(Continued)

*Primary Examiner* — Anthony R Shumate
(74) *Attorney, Agent, or Firm* — Birch, Stewart, Kolasch & Birch, LLP

(57) ABSTRACT

Provided is a gas separation membrane that can be used continuously. The gas separation membrane comprises: a porous support membrane that contains an aromatic polyamide in which an aromatic ring has been replaced with a chloro group; and a separation functional layer that is disposed on the surface of the porous support membrane and (Continued)

contains a cross-linked polyamide obtained by polycondensation of a polyfunctional amine and a polyfunctional acid halide.

9 Claims, 1 Drawing Sheet

(51) Int. Cl.
*B01D 63/10* (2006.01)
*B01D 69/10* (2006.01)
*B01D 69/12* (2006.01)

(56) References Cited

U.S. PATENT DOCUMENTS

| | | | |
|---|---|---|---|
| 10,292,438 B2 * | 5/2019 | Fortenbacher | A41D 13/0051 |
| 10,478,783 B2 * | 11/2019 | Noda | B01D 69/147 |
| 11,033,863 B2 * | 6/2021 | Urffer | C04B 35/565 |
| 2005/0118479 A1 | 6/2005 | Yamaguchi et al. | |
| 2008/0197070 A1 * | 8/2008 | Sirkar | B01D 69/125 |
| | | | 210/500.27 |
| 2010/0313752 A1 | 12/2010 | Powell et al. | |
| 2011/0253619 A1 * | 10/2011 | Aizawa | B01D 53/228 |
| | | | 210/489 |
| 2012/0080378 A1 | 4/2012 | Revanur et al. | |
| 2012/0241371 A1 | 9/2012 | Revanur et al. | |
| 2012/0297984 A1 * | 11/2012 | Chung | C01B 3/503 |
| | | | 96/10 |
| 2013/0095241 A1 | 4/2013 | Lulevich et al. | |
| 2014/0014575 A1 | 1/2014 | Kwon et al. | |
| 2014/0345462 A1 | 11/2014 | Itou | |
| 2015/0165390 A1 | 6/2015 | Hiranabe et al. | |
| 2015/0190761 A1 | 7/2015 | Kwon et al. | |
| 2015/0336056 A1 | 11/2015 | Ouchi | |
| 2016/0136581 A1 * | 5/2016 | Sawada | B01D 61/38 |
| | | | 422/222 |
| 2018/0106474 A1 * | 4/2018 | Fortenbacher | H05B 3/20 |
| 2018/0108956 A1 * | 4/2018 | Fortenbacher | H01M 10/6571 |
| 2018/0110097 A1 * | 4/2018 | Fortenbacher | H05B 3/58 |
| 2018/0133654 A1 | 5/2018 | Kodama et al. | |
| 2018/0264413 A1 * | 9/2018 | Furuno | C02F 1/44 |

FOREIGN PATENT DOCUMENTS

| | | |
|---|---|---|
| JP | 59-59213 A | 4/1984 |
| JP | 2003-263998 A | 9/2003 |
| JP | 2012-250494 A | 12/2012 |
| JP | 2014-14728 A | 1/2014 |
| JP | 2014-524827 A | 9/2014 |
| JP | 2017-212201 A | 11/2017 |
| WO | WO 2012/047282 A2 | 4/2012 |
| WO | WO 2012/060229 A1 | 5/2012 |
| WO | WO 2013/122151 A1 | 8/2013 |
| WO | WO 2013/180218 A1 | 12/2013 |
| WO | WO 2016/194832 A1 | 12/2016 |

OTHER PUBLICATIONS

Extended European Search Report for European Application No. 18894685.9, dated Aug. 25, 2021.

Petersen et al., "Novel Polyamide Composite Membranes for Gas Separation Prepared by Interfacial Polycondensation," Journal of Applied Polymer Science, vol. 63, No. 12, 1997, pp. 1557-1563, 7 pages total.

Sridhar et al., "Gas permeation properties of polyamide membrane prepared by interfacial polymerization," Journal of Materials Science, vol. 42, 2007, pp. 9392-9401, 10 pages total.

Wu et al., "Preparation, characterization and application of a novel thermal stable composite nanofiltration membrane," Journal of Membrane Science, vol. 326, 2009, pp. 429-434, 6 pages total.

Zarshenas et al., "Surface modification of polyamide composite membranes by corona air plasma for gas separation applications," RSC Advances, vol. 5, 2015, pp. 19760-19772, 13 pages total.

Albo et al., "Gas transport properties of interfacially polymerized polyamide composite membranes under different pre-treatments and temperatures", Journal of Membrane Science, (2014), vol. 449, p. 109-118.

International Search Report, issued in PCT/JP2018/047910, PCT/ISA/210, dated Apr. 2, 2019.

Notice of Reasons for Refusal for Japanese Application No. 2019-500601, dated Mar. 17, 2020.

Written Opinion of the International Searching Authority, issued in PCT/JP2018/047910, PCT/ISA/237, dated Apr. 2, 2019.

Chinese Office Action and Search Report for Chinese Application No. 201880082138.7, dated Sep. 13, 2021, with an English translation.

* cited by examiner

GAS SEPARATION MEMBRANE, GAS SEPARATION MEMBRANE ELEMENT, AND GAS SEPARATION METHOD

TECHNICAL FIELD

The present invention relates to a gas separation membrane and a gas separation membrane element which separates light gases represented by helium and hydrogen from carbon dioxide and nitrogen by a polyamide composite membrane, and also to a gas separation method in which the separation membrane and the gas separation membrane element are used.

BACKGROUND ART

Hydrogen is nowadays attracting attention as a clean energy source. Hydrogen is obtained by gasifying a fossil fuel such as natural gas or coal, obtaining a mixed gas including hydrogen and carbon dioxide as main components and removing the carbon dioxide from the mixed gas. The gas to be treated has undergone steam reforming and water gas shift reactions, and hence it has characteristics of a high temperature and a high pressure. Further, hydrogen is also used in the Haber-Bosch method for synthesizing ammonia. This is a method for synthesizing ammonia by reacting hydrogen with nitrogen at a high temperature and a high pressure, and the method needs a process of separating and recovering unreacted hydrogen and nitrogen in a production plant.

For a method for concentrating a specific gas from a mixed gas at low cost, a membrane separation method including selectively permeating a target gas by utilizing difference in material's gas permeability is attracting attention.

Non Patent Literature 1 discloses a technique achieving a high gas permeability by inclusion of an extremely thin functional layer formed by a crosslinked aromatic polyamide through an interfacial polycondensation reaction.

CITATION LIST

Non Patent Literature

Non Patent Literature 1: Albo and three others, Journal of Membrane Science, 449, 2014, pp. 109-118

SUMMARY OF INVENTION

Technical Problem

However, in conventional membranes, when gas separation is continuously performed, particularly at a high temperature, gas permeability or gas selectivity may decrease.

The present invention has been made in view of the above conventional problems, and an object thereof is to provide a gas separation membrane or the like which can be continuously used and has an improved separation selectivity of light gases such as hydrogen and helium from carbon dioxide or light gases from nitrogen.

Solution to Problem

In order to solve the above problems, the present invention has any one of the following constitution:

[1] A gas separation membrane including: a porous support membrane containing an aromatic polyamide containing an aromatic ring substituted with a chloro group; and a separation functional layer provided on the porous support membrane and containing a crosslinked polyamide which is a polycondensate of a polyfunctional amine and a polyfunctional acid halide.

[2] The gas separation membrane according to [1], in which the aromatic polyamide contained in the porous support membrane has a structure represented by at least one of the following formulas (1) or (2);

[Chem. 1]

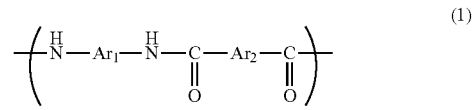

[Chem. 2]

in which, $Ar_1$, $Ar_2$, and $Ar_3$ are each at least one group selected from the group consisting of groups represented by the following formulas (3) and (4), X, Y, and Z are at least one group selected from the group consisting of —O—, —$CH_2$—, —CO—, —$CO_2$—, —S—, —$SO_2$—, —$C(CH_3)_2$—;

[Chem. 3]

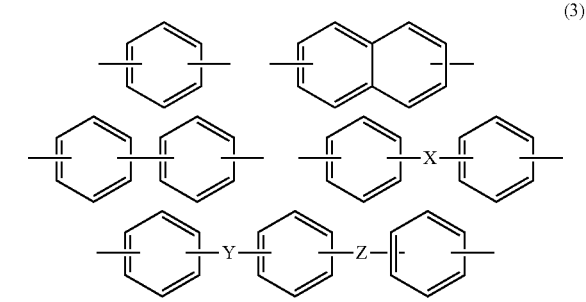

[Chem. 4]

[3] The gas separation membrane according to [2], in which the gas separation membrane has a structure represented by the formula (3), and the substituent is incorporated in a para position.

[4] The gas separation membrane according to any one of [1] to [3], in which the pores having a pore diameter of 8 nm or more are 15% or less of all pores on a surface of the porous support membrane.

[5] The gas separation membrane according to any one of [1] to [4], in which a maximum pore diameter on the surface of the porous support membrane is 12 nm or less.

[6] A gas separation membrane element including: a center pipe for collecting a permeate gas; and the gas separation membrane according to any one of [1] to [5], which is spirally wound around the center pipe.

[7] A gas separation method using the gas separation membrane according to any one of [1] to [5], including steps of: (a) feeding a mixed gas containing at least one of hydrogen or helium to one surface of the gas separation membrane; and (b) obtaining a gas having a higher concentration of at least one of hydrogen or helium than that of the mixed gas from the other surface of the gas separation membrane.

[8] The gas separation method according to [7], in which the mixed gas in the step (a) contains at least one of carbon dioxide and nitrogen.

[9] The gas separation method according to [7] or [8], in which the mixed gas has temperature of 80° C. or higher.

Advantageous Effects of Invention

The present invention can provide a gas separation membrane which attains both separation selectivity of light gases, such as hydrogen and helium, and the heat resistance, a gas separation membrane element, and a gas separation method in which the gas separation membrane and the gas separation membrane element are used.

DESCRIPTION OF EMBODIMENTS

1. Gas Separation Membrane

Figure 1:
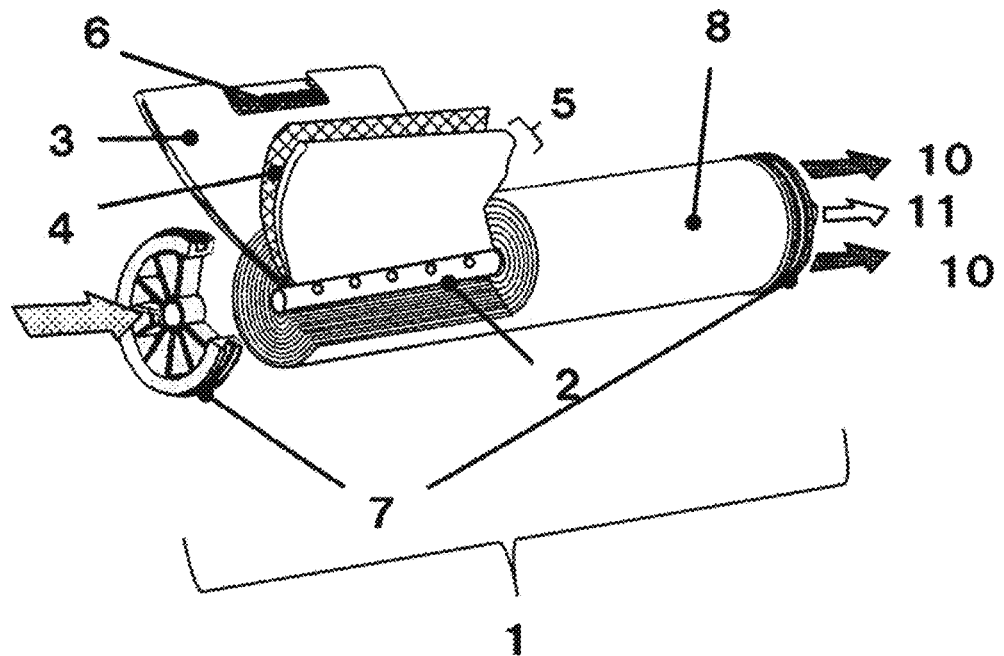
FIG. 1 is a partly developed perspective view showing an embodiment of a gas separation membrane element of the present invention.

The gas separation membrane includes a porous support membrane and a separation functional layer which is provided on the porous support membrane and contains a crosslinked polyamide obtained by polycondensation of a polyfunctional amine and a polyfunctional acid halide.

The porous support membrane may contain a substrate and a porous support layer. However, the present invention is not limited thereto. For example, the porous support membrane may be composed only of the porous support layer without the substrate.

(1-1) Substrate

Examples of the substrates include a polyester-based polymer, a polyamide-based polymer, a polyolefin-based polymer, polyphenylene sulfide, and mixtures or copolymers thereof. Especially preferred is fabric of a polyester-based polymer which is highly stable mechanically and thermally. Advantageously usable forms of the fabric are long-fiber nonwoven fabric, short-fiber nonwoven fabric, and woven or knit fabric. The term "long-fiber nonwoven fabric" means nonwoven fabric having an average fiber length of 300 mm or longer and an average fiber diameter of 3 μm to 30 μm.

The substrate preferably has an air permeability of 0.5 cc/cm²/sec to 5.0 cc/cm²/sec. When the air permeability of the substrate is within that range, a polymer solution which is to form a porous support layer infiltrates into the substrate, hence, the adhesion between the porous support layer and the substrate can be improved and the physical stability of the support membrane can be enhanced.

The substrate has thickness of preferably in the range of 10 μm to 200 μm, more preferably in the range of 30 μm to 120 μm. In this description, the term "thickness" means average value unless otherwise indicated. The average value herein is an arithmetic mean value. Specifically, the thickness of the substrate and the thickness of the porous support layer each is determined by examining a cross-section thereof to measure the thickness thereof at twenty points at intervals of 20 μm along the direction (plane direction of the membrane) perpendicular to the thickness direction and calculating an average of the twenty thickness values.

(1-2) Porous Support Layer

The porous support layer is a layer which has substantially no gas-separating ability and which imparts strength to the separation functional layer having substantial gas-separating ability.

As a result of intensive studies, the inventors have found that the material of the porous support layer is important for heat resistance, that is, operation stability at high temperature. When the main component of the support membrane is an aromatic polyamide containing an aromatic ring substituted with a chloro group, the gas permeability and selectivity are less likely to decrease even at high temperatures.

The aromatic polyamide has a hydrogen bonding site and therefore has a strong intermolecular interaction. That is, the molecular motion of the aromatic polyamide is also limited even at high temperatures.

In addition, the chloro group also induces a further hydrogen bonding by high electron withdrawing effects and increases intermolecular interaction. Therefore, the aromatic polyamide containing the chloro group is hard to melt, and its shape can be maintained. As a result, it is considered that the support membrane containing an aromatic polyamide containing an aromatic ring substituted with the chloro group has high heat resistance.

The porous support layer preferably contains an aromatic polyamide containing repeating units represented by the following chemical formulas (1) and (2).

[Chem. 5]

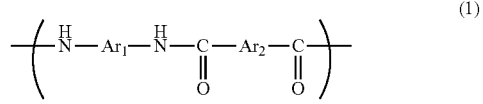
(1)

[Chem. 6]

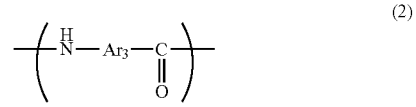
(2)

in which, $Ar_1$, $Ar_2$, and $Ar_3$ are each at least one group selected from the group consisting of groups represented by the following formulas (3-1) to (3-5) and formula (4); X, Y, and Z are at least one group selected from the group consisting of —O—, —CH$_2$—, —CO—, —CO$_2$—, —S—, —SO$_2$—, —C(CH$_3$)$_2$—;

[Chem. 7]

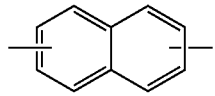
(3-1)

(3-2)

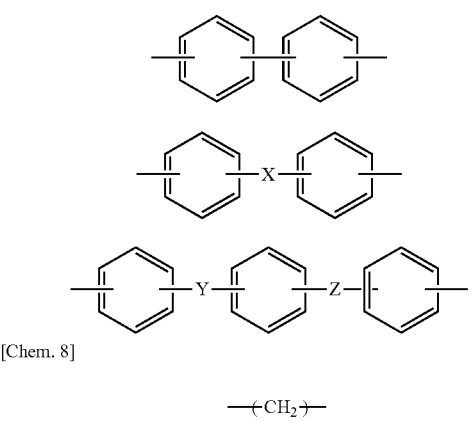

[Chem. 8]

$$-(CH_2)-\qquad (4)$$

Specifically, in the aromatic polyamide, a mole fraction which is the proportion of the number of moles of the group corresponding to the formulas (3-1) to (3-5) to the sum of the number of moles of $Ar_1$, $Ar_2$ and $Ar_3$ is preferably 60 mol % or more, more preferably 80 mol % or more, and even more preferably 98 mol % or more. By using the support membrane having such a chemical structure, separation selectivity between hydrogen and nitrogen is improved.

When $Ar_1$, $Ar_2$, and $Ar_3$ each have a structure represented by the formulas (3-1) to (3-5), the aromatic ring has two substituents (i.e., —NH, —CO—, or both functional groups) involved in an amino bonding, as shown in formulas (1) and (2). The positions of these two substituents on the aromatic ring may be a para position and a meta-position. In the porous support layer, the polyamide molecule preferably contains para-substituted products in which these substituents are incorporated into the para positions. Further, the number of the aromatic rings as the para-substituted product is preferably 50% or more, more preferably 80% or more, and still more preferably 90% or more of the total number of the aromatic rings contained in the polyamide molecule. The "number" is paraphrased as "number of moles". A meta-substituted product has a bent structure, and the para-substituted product has a linear structure. This difference in structure is considered to affect the performance of the membrane. The porous support layer may be formed of only para-aramid.

The denominator in the proportion of para-substituted product is the total number of moles of the aromatic rings contained in the polyamide. For example, the structures of formulas (3-3), (3-4) and (3-5) have the number of aromatic rings of 2, 2, and 3, respectively. The naphthalene (formula (3-2)) has one aromatic ring.

Regarding the number of molecules in the proportion of para-substitutions, for example, in the structure of formula (3-4-mp), the number of para-substituted product is 1. In addition, although the substitution position of naphthalene (formula (3-2)) is not usually referred to as para or meta, in the present specification, ana-substituted products, amphi-substituted products are regarded as para-substituted products, and the other structure is regarded as a meta-substituted products.

TABLE 1

| | Structures having substitution positions only at para position | | | |
|---|---|---|---|---|
| | Structure | Basic Structure | Number of Aromatic Rings | Number of Para-substitutions |
| 3-1-p | | 3-1 | 1 | 1 |
| 3-2-p-1 Count as para-substitutions | | 3-2 | 1 | 1 |
| 3-2-p-2 Count as para-substitutions | | 3-2 | 1 | 1 |
| 3-3-pp | | 3-3 | 2 | 2 |
| 3-4-pp | | 3-4 | 2 | 2 |

TABLE 1-continued

Structures having substitution positions only at para position

| | Structure | Basic Structure | Number of Aromatic Rings | Number of Para-substitutions |
|---|---|---|---|---|
| 3-5·ppp | | 3-5 | 3 | 3 |

TABLE 2

Structures having substitution positions of para and meta positions

| | Structure | Basic Structure | Number of Aromatic Rings | Number of Para-substitutions |
|---|---|---|---|---|
| 3-3·mp | | 3-3 | 2 | 1 |
| 3-4·mp | | 3-4 | 2 | 1 |
| 3-5·pmp | | 3-5 | 3 | 2 |
| 3-5·mpp | | 3-5 | 3 | 2 |
| 3-5·mmp | | 3-5 | 3 | 1 |

TABLE 2-continued

Structures having substitution positions of para and meta positions

| Structure | | Basic Structure | Number of Aromatic Rings | Number of Para-substitutions |
|---|---|---|---|---|
| 3-5•mpm | [chemical structure: meta-Y-para-Z-para] | 3-5 | 3 | 1 |
| | [chemical structure: meta-Y-para-Z-meta] | | | |

It is to be noted that the arrangement of the above meta and para are descriptions of the substituents involved in the amide bonding. Even if it has another substituent, it is not counted as a para-substitution. For example, even if the para position to —X— in the meta-substituted product in the structure of the formula (3-4-mp) is substituted with the chloro group, this is not counted as a para-substituted product.

Here, the proportion (mole fraction) of the number of moles of the chloro groups to the sum of the number of moles of the aromatic rings is preferably 20 mol % or more, more preferably 40 mol % or more, and even more preferably 80 mol % or more. When the proportion of the number of moles of the chloro groups is within the above range, more excellent gas permeability or gas selectivity is exhibited at high temperatures.

A contact angle of the porous support layer with water is preferably 75° or less, more preferably 55° or less, and still more preferably 50° or less. Since the aromatic polyamide contained in the porous support layer is a hydrophilic polymer, a porous support layer having a contact angle with water in the above range is realized due to the hydrophilicity of the aromatic polyamide.

It is preferable that the porous support layer includes the polymer described above as a main component. Specifically, the proportion of the polymer described above (in the case where a plurality of polymers of the kind described above are contained, the sum of the proportions of these polymers) in the porous support layer is preferably 70 wt % or more, 80 wt % or more, or 90 wt % or more. Most preferably, the porous support layer is composed of the above-described polymer only.

Regarding the pore diameter and pore distribution of the porous support layer, the number of pores having a diameter of 8 nm or more is preferably 15% or less, more preferably 11% or less, of the total number of pores on the surface of the porous support layer on the side in contact with the separation function layer. The pore can be referred to as a "cavity portion". The cavity portion is also a portion sandwiched between projection portions. That is, the porous support layer has fine unevenness on its surface. The projection portions serve as a scaffold (starting point) for growth of the crosslinked polyamide in polycondensation. The number of pores having a diameter of 8 nm or more being 15% or less of the total number of pores means the number of portions in which the distance between the projection portions on the surface of the porous support layer is 8 nm or more is small. Therefore, there is an effect that defects are unlikely to occur in the crosslinked polyamide.

In addition, the maximum pore diameter on the surface of the porous support layer being 11 nm or less means that the distance between the scaffolds is 11 nm or less, so that occurrence of defects is further prevented.

The pore diameter on the surface of the porous support layer is measured as follows. Five arbitrary points on the surface of the porous support layer are photographed by SEM (2,000,000 magnification, 0.3072 square μm) to obtain five images. The pore diameter and the number of pores are measured by five SEM photographs.

The maximum pore diameter is an arithmetic mean of three numerical values excluding a minimum value and a maximum value from the maximum pore diameter obtained in each of the five SEM photographs.

The proportion of the number of pores having a diameter of 8 nm or more is calculated as follows. First, the number of pores having a diameter of 8 nm or more measured from each of the five SEM photographs is divided by the total number of pores in each of the photographs and further multiplied by 100 to calculate the proportion of pores having a diameter of 8 nm or more. The minimum value and the maximum value from the five values thus obtained are excluded and the arithmetic mean of the three numerical values is the proportion of the number of pores having a diameter of 8 nm or more in the membrane. Before the measurement of the pore diameter and the number of pores, image correction may be performed on the image to remove shadows due to the granular structure of the surface instead of the pores.

In addition, to observe the surface of the porous support layer while the separation functional layer being provided thereon, first, the separation functional layer is removed from the separation membrane to expose the surface of the porous support layer. The removal method may be, for example, immersing the separation membrane in an aqueous solution of sodium hypochlorite, but is not particularly limited.

The pore diameter and the pore distribution inside the porous support layer are not particularly limited. For example, the pore diameter may be uniform throughout the porous support layer, or may gradually increase from the surface of the porous support layer on the side in contact with the separation function layer toward the other surface.

The thickness of the substrate and that of the porous support layer affect the strength of the gas separation membrane and the packing density of the gas separation membrane when it is incorporated into an element. To obtain sufficient mechanical strength and packing density, the total thickness of the substrate and porous support layer is preferably 30 µm or more and 300 µm or less, more preferably 100 µm or more and 220 µm or less. The porous support layer has thickness of preferably 20 µm or more and 100 µm or less. In this description, the term "thickness" means average value unless otherwise indicated. The average value herein is arithmetic mean value. That is, the thickness of the substrate and the thickness of the porous support layer is determined by examining a cross-section thereof by measuring thicknesses of twenty points at intervals of 20 µm along the direction (plane direction of the membrane) perpendicular to the thickness direction and calculating an average of the twenty thickness values.

(1-3) Separation Functional Layer

The separation functional layer has a thin membrane containing a crosslinked polyamide as a main component obtained by a polycondensation reaction between a polyfunctional amine and a polyfunctional acid halide. In other words, the separation functional layer contains a crosslinked polyamide as a main component. Specifically, the proportion of the crosslinked polyamide in the separation functional layer is 50 wt % or more, 70 wt % or more, or 90 wt % or more, and the separation functional layer may be composed of the crosslinked polyamide only. When the separation functional layer contains 50 wt % or more of the crosslinked polyamide, it is easy for the membrane to exhibit high performance. The crosslinked polyamide may be a wholly aromatic polyamide, a wholly aliphatic polyamide, or may have both an aromatic portion and an aliphatic portion, but it is preferably a wholly aromatic in order to express higher performance.

Further, the polyfunctional amine is specifically a polyfunctional aromatic amine or a polyfunctional aliphatic amine.

The "polyfunctional aromatic amine" refers to an aromatic amine in which one molecule contains two or more amino groups of at least one of a primary amino group and a secondary amino group and at least one of the amino groups is a primary amino group. The "polyfunctional aliphatic amine" refers to an aliphatic amine having two or more amino groups of at least one of a primary amino group and a secondary amino group in one molecule.

Examples of the polyfunctional aromatic amines include polyfunctional aromatic amines including an aromatic ring having two amino groups bonded thereto in ortho, meta, or para positions, such as o-phenylenediamine, m-phenylenediamine, p-phenylenediamine, o-xylylenediamine, m-xylylenediamine, p-xylylenediamine, o-diaminopyridine, m-diaminopyridine, p-diaminopyridine; and 1,3,5-triaminobenzene, 1,2,4-triaminobenzene, 3,5-diaminobenzoic acid, 3-aminobenzylamine, 4-aminobenzylamine, 2,4-diaminothioanisole, 1,3-diaminothioanisole, 1,3-diamino-5-(dimethylphosphino) benzene, (3,5-diaminophenyl)dimethylphosphine oxide, (2,4-diaminophenyl)dimethylphosphine oxide, 1,3-diamino-5-(methylsulfonyl)benzene, 1,3-diamino-4-(methylsulfonyl)benzene, 1,3-diamino-5-nitrosobenzene, 1,3-diamino-4-nitrosobenzene, 1,3-diamino-5-(hydroxylamino)benzene, and 1,3-diamino-4-(hydroxyamino)benzene.

Examples of the polyfunctional aliphatic amines include ethylenediamine, 1,3-diaminopropane, 1,4-diaminobutane, 1,5-diaminopentane, piperazine, 2-methylpiperazine, 2,4-dimethylpiperazine, 2,5-dimethylpiperazine, 2,6-dimethylpiperazine.

One of those polyfunctional amines may be used alone, or two or more thereof may be used in combination.

In addition, the polyfunctional acid halide is specifically a polyfunctional aromatic acid halide or a polyfunctional aliphatic acid halide.

The polyfunctional acid halide is also referred to as a polyfunctional carboxylic acid derivative, and refers to an acid halide having at least two halogenated carbonyl groups in a molecule. Examples of the trifunctional acid halide include trimesoyl chloride, and examples of the bifunctional acid halide include biphenyl dicarboxylic acid dichloride, azobenzene dicarboxylic acid dichloride, terephthalic acid chloride, isophthalic acid chloride, naphthalene dicarboxylic acid chloride, oxalyl chloride.

In view of the reactivity with a polyfunctional amine, the polyfunctional acid halide is preferably a polyfunctional acid chloride. Further, in view of the separation selectivity and heat resistance of the membrane, and the polyfunctional acid halide is preferably a polyfunctional acid chloride having two to four carbonyl chloride groups in a molecule.

Among these, trimesoyl chloride is more preferred because of its availability and handleability. One of these polyfunctional acid halides may be used alone, or two or more thereof may be used in combination.

The polycondensation reaction is specifically an interfacial polycondensation.

Here, it is preferable that at least one of the polyfunctional amine and the polyfunctional acid halide contains a compound having three or more functional groups.

Further, the separation functional layer has thickness of usually in the range of 0.01 µm to 1 µm, preferably in the range of 0.1 µm to 0.5 µm in order to obtain sufficient separation performance and gas permeability.

2. Method for Producing Gas Separation Membrane

A method for producing the gas separation membrane is explained next.

(2-1) Formation of Porous Support Membrane

A laminate including a substrate and a porous support layer is referred to as a porous support membrane. In the following examples, a method of forming a porous support membrane includes a step of applying a polymer solution to a substrate and a step of wet coagulation of the polymer by immersing the polymer solution in a coagulation bath. The coagulated polymer corresponds to a porous support layer.

The method for forming the support membrane may include a step of generating a polymer that forms the porous support layer by polymerizing monomers.

Aromatic polyamide is an example of polymers and is obtained by solution polymerization or interfacial polymerization using an acid chloride and a diamine as monomers. In the solution polymerization, an aprotic organic polar solvent such as N-methylpyrrolidone (NMP), dimethylacetamide (DMAc), or dimethylformamide (DMF) can be used as a solvent. In addition, in the interfacial polymerization, a solution obtained by dissolving an acid chloride in these organic solvents and a solution obtained by dissolving a diamine in an aqueous medium are used.

When a polyamide is produced using an acid chloride and a diamine as monomers, hydrogen chloride is produced as a by-product. For neutralizing the hydrogen chloride, inorganic neutralizing agents such as calcium hydroxide, calcium carbonate, and lithium carbonate, and organic neutralizing agents such as ethylene oxide, propylene oxide, ammonia, triethylamine, triethanolamine, and diethanolamine are used.

When a monomer is polymerized to form a polymer, the polymer is obtained as dissolved in a solvent. Therefore, the polymer solution may be used as it is as a membrane forming solution, or the polymer may be isolated once, and then re-dissolved in the above organic solvent or an inorganic solvent such as sulfuric acid to prepare a membrane forming solution.

Concentration of the polymer solution for forming the porous support membrane is not particularly limited, but is preferably 2 wt % or more and 15 wt % or less, and preferably 4 wt % or more and 12 wt % or less. By setting the concentration to 4 wt % or more, the internal structure can be prevented from becoming too empty. By setting the concentration to 12 wt % or less, the viscosity of the polymer solution can be prevented from becoming extremely high.

It is preferable to use NMP as the membrane forming solvent of the polymer, and it is more preferable to use a mixed solvent of NMP and an organic polar solvent other than NMP. NMP is excellent in compatibility with the above polymer and is useful for forming a porous support layer. Further, by using the mixed solvent, the speed of the solvent flowing out when forming the porous support layer can be appropriately adjusted, and gas pore size distribution, density, and the like can be adjusted to a desired range. The solubility parameter value of the organic polar solvent is preferably 11.0 or more and 13.2 or less. When the solubility parameter value of the organic polar solvent is in the above numerical range, the affinity of the organic polar solvent with the polymer is relatively inferior to that of NMP, so that the phase separation of the polymer proceeds quickly. As a result, the formation of the large pores due to the outflow of the solvent during the phase separation is prevented. When the solubility parameter value is more than 13.2, the phase separation is not accelerated. When the solubility parameter value is 11.0 or more, the polymer is less likely to precipitate in the polymer solution, so that a porous support layer having a uniform structure can be formed.

The organic polar solvent may be one selected from the group consisting of acetone, anisole, THF, cyclohexanone, aniline, DMAc, and the like, but is not particularly limited thereto. Among these, it is preferable to use acetone.

The mixing ratio of the mixed solvent is not particularly limited, but the ratio of NMP is preferably 60 wt % or more and 99 wt % or less, and more preferably 70 wt % or more and 90 wt % or less. Further, the ratio of NMP is more preferably 80 wt % or more and 90 wt % or less. When the mixing ratio of NMP in the mixed solvent is more than 99 wt %, the proportion of the organic polar solvent mixed with NMP is small, and the effect described above is not exhibited. When the mixing ratio of NMP is less than 60 wt %, the viscosity of the polymer solution increases, and it becomes difficult to form a porous support layer.

The polymer concentration of the solution used for forming the porous support membrane is not particularly limited, but is preferably 2 wt % or more and 15 wt % or less, and preferably 4 wt % or more and 12 wt % or less. By setting the concentration to 4 wt % or more, the internal structure can be prevented from becoming empty. By setting the concentration to 12 wt % or less, the viscosity of the polymer solution can be prevented from becoming extremely high.

The formation of the porous support layer using the polymer solution described above is also preferred in that the pore diameter on the surface of the porous support layer is within an appropriate range.

(2-2) Method for Producing Separation Functional Layer

Next, steps for forming the separation functional layer as a constituent of the gas separation membrane are explained. The steps for forming the separation functional layer include:

(a) bringing an aqueous solution containing a polyfunctional amine into contact with the surface of the porous support layer; and (b) bringing an organic-solvent solution containing a polyfunctional acid halide into contact with the porous support layer with which the aqueous solution containing a polyfunctional amine has been brought into contact.

In step (a), the concentration of the polyfunctional amine in the aqueous solution containing the polyfunctional amine is preferably in the range of 0.1 wt % or more and 20 wt % or less, and more preferably in the range of 0.5 wt % or more and 15 wt % or less. When the concentration of the polyfunctional amine is within the range, sufficient solute-removing ability and water permeability can be obtained.

The aqueous solution containing the polyfunctional amine may contain a surfactant, organic solvent, alkaline compound, antioxidant, etc. so long as these ingredients do not inhibit the reaction between the polyfunctional amine and the polyfunctional acid halide. Surfactants have the effect of improving the wettability of the surface of the supporting membrane to lower interfacial tension between the aqueous solution containing the polyfunctional amine and nonpolar solvents. Some organic solvents serve as catalysts for the interfacial polycondensation reaction, and addition thereof sometimes enables efficient interfacial polycondensation reaction.

It is preferable that the aqueous solution containing the polyfunctional amine is brought into contact with the surface of the porous support layer evenly and continuously. Specific examples include a method in which the aqueous solution containing the polyfunctional amine is coated on the porous support layer and a method in which the porous support layer is immersed in the aqueous solution containing the polyfunctional amine. The time period during which the porous support layer is in contact with the aqueous solution containing the polyfunctional amine is preferably 1 second or more to 10 minutes or less, more preferably 10 seconds or more to 3 minutes or less.

After the contact of the aqueous solution containing the polyfunctional amine with the porous support layer, the excess solution should be sufficiently removed not to allow droplets to remain on the membrane. By sufficiently removing the liquid, it is possible to prevent a trace of the droplet from causing a film defect after the formation of the porous support layer, resulting in a deterioration in film performance. Examples of methods for the excess-solution removal include: a method in which the support membrane which has been contacted with the aqueous solution containing the polyfunctional amine is held vertically to make the excess solution flow down naturally, as described, for example, in JP-A-2-78428; and a method in which a stream of a gas, e.g., nitrogen, is blown against the surface of the porous support layer from an air nozzle to forcedly remove the excess solution. After the excess-solution removal, the membrane surface may be dried to remove some of the water contained in the aqueous solution.

In step (b), the concentration of the polyfunctional acid halide in the organic-solvent solution thereof is preferably in the range of 0.01 wt % or more and 10 wt % or less, more preferably in the range of 0.02 wt % to 2.0 wt %. By setting the concentration thereof to 0.01 wt % or more, a sufficient reaction rate is obtained, and by setting the concentration thereof to 10 wt % or less, the occurrence of side reactions can be inhibited. It is more preferred to incorporate an acylation catalyst such as DMF into the organic-solvent solution, since the interfacial polycondensation is accelerated.

The organic solvent in the organic-solvent solution is desirably a water-immiscible organic solvent, dissolves the polyfunctional acid halide and does not damage the support membrane. Any such organic solvent which is inert to the polyfunctional amine compound and the polyfunctional acid halide may be used. Preferred examples thereof include hydrocarbon compounds such as n-hexane, n-octane, n-decane, n-undecane and isooctane.

For bringing the organic-solvent solution containing the polyfunctional acid halide into contact with the porous support layer with which the aqueous solution containing the polyfunctional aromatic amine compound has been brought into contact, the same method as that used for bringing the aqueous solution containing the polyfunctional amine into contact with the porous support layer may be used.

In this step, the porous support layer with which the organic-solvent solution containing the polyfunctional acid halide has been brought into contact may be heated. The temperature at which the porous support layer is heated is 50° C. or higher and 180° C. or lower, preferably 60° C. or higher and 160° C. or lower. By heating the porous support layer at 60° C. or higher, the decrease in reactivity due to monomer consumption in the interfacial polymerization reaction can be compensated for by the reaction-accelerating effect of heat. By heating the porous support layer at 160° C. or lower, considerable decrease in the reaction efficiency due to complete volatilization of the solvent can be prevented.

The heating treatment time is preferably 5 seconds or longer and 180 seconds or less. By setting the heating treatment time to 5 seconds or longer, a reaction-accelerating effect can be obtained. By setting the heating treatment time to 180 seconds or less, complete volatilization of the solvent can be prevented.

Further, a chemical treatment is given to the obtained gas separation membrane to chemically convert the terminal amino group of the crosslinked polyamide into a nitro group structure having a low affinity with carbon dioxide, so that the separation selectivity between the light gas and the carbon dioxide can be improved. Specifically, a water-soluble oxidizing agent is preferably brought into contact with the gas separation membrane. Examples of the water-soluble oxidizing agent include hydrogen peroxide, peracetic acid, sodium perborate, and potassium peroxymonosulfate.

The method of reacting the water-soluble oxidizing agent with the crosslinked polyamide is not particularly limited. For example, it is preferable to immerse the gas separation membrane of the crosslinked polyamide in an aqueous solution containing a water-soluble oxidizing agent.

The concentration of the water-soluble oxidizing agent is preferably from 0.1 wt % to 10 wt %, and more preferably from 0.5 wt % to 3 wt %.

The pH of the aqueous solution containing the water-soluble oxidizing agent is not particularly limited as long as the oxidizing power of the oxidizing agent can be sufficiently exhibited, but is preferably in the range of 1.5 to 7.0.

As a chemical treatment method, the aqueous solution containing the water-soluble oxidizing agent is preferably treated at 10° C. or higher and 100° C. or lower, more preferably 20° C. or higher and 80° C. or lower. By setting the temperature to 20° C. or higher, the efficiency of the reaction can be improved. By setting the temperature to 80° C. or lower, the decomposition of the oxidizing agent can be suppressed.

The contact time between the aqueous solution containing the water-soluble oxidizing agent and the crosslinked polyamide is preferably 30 seconds to 1 day, more preferably 1 minute to 30 minutes, in view of both practicality and reaction efficiency.

After the contact between the aqueous solution containing the water-soluble oxidizing agent and the crosslinked polyamide, the crosslinked polyamide is brought into contact with a reducing agent to stop the oxidation reaction. Here, the reducing agent is not particularly limited as long as it causes an oxidation-reduction reaction with an oxidizing agent used, but it is preferable to use any one of sodium hydrogen sulfite, sodium sulfite, and sodium thiosulfate because of availability and handleability. Further, the reducing agent is preferably used as an aqueous solution of 0.01 wt % to 1 wt %.

The contact time between the reducing agent and the crosslinked polyamide is sufficient as long as it can stop the oxidation reaction, and is usually preferably 1 minute to 20 minutes.

After the contact of the reducing agent and the crosslinked polyamide, it is preferable to rinse with water in order to wash out the reducing agent remaining in the crosslinked polyamide composite membrane.

The presence of the functional group derived from the nitro group can be determined by analyzing the polyamide by X-ray photoelectron spectroscopy (XPS). Specifically, the X-ray photoelectron spectroscopy (XPS) exemplified in Journal of Polymer Science, Vol. 26, 559-572 (1988) and Journal of the Adhesion Society of Japan, Vol. 27, No. 4 (1991) can be used.

The N1s peak obtained by XPS is due to core electrons of the nitrogen atom. Since the N1s peak is considered to be composed of a component derived from N—C and a component derived from NOx ($x \geq 2$), when the N1s peak is divided into two components, the component derived from N—C appears around 400 eV and the component derived from NOx ($x \geq 2$) appears around 406 eV. Based on that, the presence of a nitro group can be detected.

The gas separation membrane thus obtained needs to be dried. Methods for the drying are not particularly limited. Water may be removed by vacuum drying, freeze drying, or high-temperature heating or the solvent is removed under those drying conditions after the gas separation membrane is immersed in an alcohol solvent, such as ethanol or isopropanol, or a hydrocarbon solvent to replace the water with the solvent.

Particularly, the high-temperature heating is preferred since a dense separation functional layer is obtained easily. Although methods for the high-temperature heating are not particularly limited, it is desirable to heat the gas separation membrane in an oven at 30° C. to 200° C., more preferably 50° C. to 150° C., for 1 minute or longer. By heating at 50° C. or higher, the water is efficiently removed. By heating at 150° C. or lower, a deformation of the gas separation membrane due to a difference in the coefficient of thermal shrinkage between the separation functional layer and the substrate can be prevented.

3. Gas Separation Membrane Element (3-1) Overview

The gas separation membrane element of the present invention includes a center pipe for collecting a permeate gas and the gas separation membranes of the present invention described above which are wound spirally around the center pipe.

In one embodiment of the gas separation membrane element of the present invention, as shown in FIG. 1, the gas separation membrane element 1 includes a gas-collecting pipe 2, gas separation membranes 3, feed-side channel members 4, and permeation-side channel members 6. However, the present invention is not limited to this structure. The gas separation membranes 3 are wound around the gas-collecting pipe 2 so that the width direction of the gas separation membranes 3 is arranged to extend along the longitudinal direction of the gas-collecting pipe 2. As a result, the longitudinal direction of the gas separation membranes 3 is arranged to extend along the winding direction.

In this description, the expression "inner end along the winding direction" means the end of a gas separation membrane 3 which is located nearer the gas-collecting pipe 2.

(3-2) Gas-Collecting Pipe

The gas-collecting pipe 2 is an example of a center pipe for collecting a permeate gas. The gas-collecting pipe 2 is sufficiently configured as long as the permeate gas flows through the inside thereof, and is not particularly limited in the material, shape, size, etc. However, with respect to the material, it is preferred to use a gas-collecting pipe made of metal, e.g., SUS (stainless used steel), aluminum, copper, brass, or titanium, from the standpoints of pressure resistance and heat resistance. With respect to shape, a cylindrical member having a side surface provided with a plurality of holes may be used.

(3-3) Gas Separation Membrane

For the gas separation membranes 3, a plurality of gas separation membranes 3 have been wound around the gas-collecting pipe 2. The gas separation membrane 3 is disposed such that a feed-side surface thereof faces the feed-side channel member 4 and a permeation-side surface thereof faces the permeation-side channel member 6.

Specifically, the gas separation membrane 3 is folded such that the feed-side surface thereof faces itself. The gas separation membrane 3 which is thus folded is superposed on another gas separation membrane 3 which also is likewise folded. Thus, the two gas separation membranes 3 are disposed such that the permeation-side surface of one gas separation membrane 3 faces the permeation-side surface of the other gas separation membrane 3.

In the thus-stacked gas separation membranes 3, the three sides, other than the inner end along the winding direction, that surround the space between the permeation-side surfaces are sealed. The gas separation membranes in which edges of the space between the permeation-side surfaces have been thus sealed up are called an envelope membrane and reference numeral "5" is assigned.

The envelope membrane 5 is a pair of two gas separation membranes disposed so that the permeation-side surfaces thereof face each other. The envelope membrane 5 has a rectangular shape, and the space between the permeation-side surfaces of the rectangular gas separation membranes 3 is open only at the winding-direction inner side and is sealed up at the other three sides so that a permeate gas flows into the gas-collecting pipe 2. The permeate gas is isolated from the feed gas 9 by the envelope membrane 5.

Sealing examples include a mode in which the sides are bonded with an adhesive, a hot-melt adhesive, a mode in which the sides are fused by heating or with a laser, and a mode in which a rubber sheet is sandwiched. The sealing by bonding is especially preferred because this is the simplest and highly effective.

In the examples described above, the inner end along the winding direction of the feed-side surface of the gas separation membrane 3 is closed by folding. However, this portion may be sealed not by folding but by bonding, fusing, etc. In cases when that portion of the feed-side surface of the gas separation membrane 3 is sealed without being folded, the gas separation membrane 3 is less likely to suffer bending at the end. Since the occurrence of bending at around a fold is inhibited, gas separation membranes 3, after having been wound, are inhibited from having gaps therebetween and from suffering a leakage due to the gaps.

The stacked gas separation membranes 3 may have the same configuration or different configurations.

The gas separation membrane sheets in which the permeation-side or feed-side surface of one of the sheets faces that of the other may be two gas separation membranes 3 or may be one gas separation membrane 3 which has been folded.

Inside the envelope membrane 5, a permeation-side channel member 6 may be disposed. Meanwhile, a feed-side channel member 4 may or may not be disposed between two adjacent envelope membranes 5.

(3-4) Permeation-Side Channel Member

The gas separation membrane element 1 may or may not have the permeation-side channel members 6, but it is preferable to have the permeation-side channel members 6. When the gas separation membrane element 1 has the permeation-side channel members 6, as shown in FIG. 1, each permeation-side channel member 6 is provided inside the envelope membrane 5, i.e., between the opposed permeation-side surfaces of gas separation membranes 3.

The permeation-side channel members 6 having a net shape are suitably used. The materials of permeation-side channel members 6 are not particularly limited, and can be selected from: metals such as SUS, aluminum, copper, brass, and titanium; and polymers such as urethane resins, epoxy resins, polyethersulfones, polyacrylonitrile, poly(vinyl chloride), poly(vinylidene chloride), poly(vinyl alcohol), ethylene/vinyl alcohol copolymers, polystyrene, styrene/acrylonitrile copolymers, styrene/butadiene/acrylonitrile copolymers, polyacetals, poly(methyl methacrylate), methacrylic/styrene copolymers, cellulose acetate, polycarbonates, poly(ethylene terephthalate), poly(butadiene terephthalate), and fluororesins (e.g., trifluorochloroethylene, poly (vinylidene fluoride), tetrafluoroethylene, tetrafluoroethylene/hexafluoropropylene copolymers, tetrafluoroethylene/perfluoroalkoxyethylene copolymers, and tetrafluoroethylene/ethylene copolymers). One of these materials may be used alone, or a mixture of two or more thereof may be used.

(3-5) Feed-Side Chanel Member

The gas separation membrane element 1 may or may not have the feed-side channel members 4, but it is preferable to have the feed-side channel members 4. When the gas separation membrane element 1 has the feed-side channel members 4, as shown in FIG. 1, each feed-side channel member 4 is provided between the opposed feed-side surfaces of gas separation membranes 3.

The feed-side channel members 4 may be sufficient as long as it can secure spaces between the gas separation membranes 3, through which a mixed gas can pass while the gas being in contact with the gas separation membranes 3.

The height (thickness) of the feed-side channel members 4 is preferably larger than 0.5 mm and 2.0 mm or less, more preferably 0.6 mm or more and 1.0 mm or less, from the standpoints of balance among performances and of operation cost.

The shape of feed-side channel members 4 are not particularly limited. Examples thereof include members such as films and nets. The material of the feed-side channel members 4 are not particularly limited, and can be selected from: metals such as SUS, aluminum, copper, brass, and titanium; and polymers such as urethane resins, epoxy resins, polyethersulfones, polyacrylonitrile, poly(vinyl chloride), poly(vinylidene chloride), poly(vinyl alcohol), ethylene/vinyl alcohol copolymers, polystyrene, styrene/acrylonitrile copolymers, styrene/butadiene/acrylonitrile copolymers, polyacetals, poly(methyl methacrylate), methacrylic/styrene copolymers, cellulose acetate, polycarbonates, poly(ethylene terephthalate), poly(butadiene terephthalate), and fluororesins (e.g., trifluorochloroethylene, poly(vinylidene fluoride), tetrafluoroethylene, tetrafluoroethylene/hexafluoropropylene copolymers, tetrafluoroethylene/perfluoroalkoxyethylene copolymers, and tetrafluoroethylene/ethylene copolymers). One of these materials may be used alone, or a mixture of two or more thereof may be used. The material of the feed-side channel members 4 may be the same as any of the materials of the gas separation membranes 3 or may be different from these.

(3-6) Other Constituent Elements

In addition to the above components, the gas separation membrane element 1 further includes the following components.

Namely, both ends (i.e., a first end and a second end) of the gas separation membrane element 1 is provided with perforated end plates 7 having a plurality of holes therein through which a feed gas 9 can pass. In the gas separation membrane element 1, an outer casing 8 covers around the peripheral surface of the wound separation membranes 3 (hereinafter referred to as "spiral").

4. Gas Separation Method

The gas separation membranes of the present invention can be used in a gas separation method for selectively permeating light gases such as hydrogen and helium to increase the concentration. Namely, the gas separation method according to the present invention includes steps of:

(a) feeding a mixed gas containing a light gas to one surface of the gas separation membrane, and (b) obtaining a gas having a light gas concentration higher than that of the mixed gas through the other surface of the gas separation membrane after the step (a).

The gas contained in the mixed gas other than the light gas is not limited to a specific type, but preferably contains at least one of carbon dioxide and nitrogen, for example. The gas separation membrane of the present invention has a large difference between permeability to hydrogen and helium and permeability to carbon dioxide and nitrogen. Consequently, hydrogen and helium can be efficiently concentrated by the gas separation membrane of the present invention.

The gas which has passed through the gas separation membrane, i.e., the gas having a higher light gas concentration, is referred to as a "permeate gas", while the gas which did not pass through and remains on the side of said one surface of the gas separation membrane is called a "concentrated gas".

In the gas separation method of the present invention, the spiral-type gas separation membrane element described above can be used. In the gas separation method of the present invention, a gas separation membrane module including a pressure vessel and spiral gas separation membrane elements of the present invention which have been connected to each other serially or in parallel and disposed in the pressure vessel can be used.

The gas separation membrane, gas separation membrane element, and gas separation membrane module described above can separate a specific gas from a feed gas, by feeding the mixed gas to them and separating a permeate gas and a concentrated gas from the feed gas. In this operation, the feed gas may be pressurized with a compressor and fed to the gas separation membrane, the gas separation membrane element, the gas separation membrane module, or the permeation side of the gas separation membrane, the gas separation membrane element, the gas separation membrane module may be depressurized with a pump. Furthermore, the gas separation membrane elements or gas separation membrane modules may be disposed in a plurality of stages to conduct gas separation. When the gas separation membrane elements or gas separation membrane modules are disposed in a plurality of stages, either the concentrated gas or permeate gas from the preceding gas separation membrane module may be fed to the succeeding gas separation membrane module. Alternatively, the concentrated gas or permeate gas in the succeeding gas separation membrane module may be mixed with a feed gas in the preceding gas separation membrane module. When a permeate gas or concentrated gas is fed to a succeeding gas separation membrane module, the gas may be pressurized with a compressor.

The pressure for the feed gas is not particularly limited, but is preferably 0.1 MPa to 10 MPa. By setting the feed pressure to 0.1 MPa or higher, the gas permeates in an increased permeation rate. By setting the feed pressure to 10 MPa or less, the gas separation membranes, the gas separation membrane elements, the gas separation membrane module components can be prevented from being deformed by pressure. The value of "the feed-side pressure/the permeation-side pressure" is not particularly limited. However, the value is preferably 2 to 20. By setting the value of "the feed-side pressure/the permeation-side pressure" to 2 or larger, the permeation rate of the gas can be increased. By setting the value of "the feed-side pressure/the permeation-side pressure" to 20 or less, the cost of operating the feed-side compressor or permeation-side pump can be reduced.

The temperature of the feed gas, although not particularly limited, is preferably 0° C. to 200° C., more preferably 25° C. to 180° C. By setting the temperature thereof to 25° C. or higher, satisfactory gas permeability is obtained. By setting the temperature thereof to 180° C. or lower, the members of the gas separation membrane module can be prevented from being thermally deformed. When the separation membranes described above is used, the gas can be fed at a temperature of 80° C. or higher, 90° C. or higher, or 100° C. or higher.

The gas separation will be described with reference to FIG. 1. A feed gas 9 fed through the first end of the gas separation membrane element 1 passes through the holes of the perforated end plate 7 and flows into feed-side channels. The feed gas 9 which has thus come into contact with the feed-side surfaces of the gas separation membranes 3 is separated into a permeate gas 11 and a concentrated gas 10 by the gas separation membranes 3. The permeate gas 11 passes through permeation-side channels and flows into the gas-collecting pipe 2. The permeate gas 11 which has passed through the gas-collecting pipe 2 flows out of the gas separation membrane element 1 through the second end of the gas separation membrane element 1. The concentrated gas 10 passes though the feed-side channels and flows out of the gas separation membrane element 1 through the holes of the perforated end plate 7 disposed at the second end. Thus, the mixed gas can be separated into the permeate gas 11 and the concentrated gas 10.

EXAMPLES

The present invention is explained below in more detail by reference to Examples, but the invention is not limited by the following Examples in any way.

Measurement of Contact Angle with Water

The support membrane was dried by allowing it to stand still in an oven at 120° C. for 30 minutes. A static contact angle of the obtained dried support membrane with water was automatically calculated by image analysis on a computer using Drop Master DM500 manufactured by Kyowa Interface Science, Inc. by the θ/2 method. The appropriate amount of the liquid was 1.5 µL, and the contact angle was measured based on the image one second after the start of the droplet deposition of distilled water on the support membrane.

Pore Size Distribution Measurement

In the gas separation membranes obtained in Examples and Comparative Examples, the size distribution of pores formed on the surface of the porous support layer was measured.

The separation functional layer of the gas separation membrane was removed to expose the surface of the porous support layer. Examples of the removal method include, but not limited to, immersing the separation membrane in an aqueous solution of sodium hypochlorite. The surface of the porous support layer was photographed by SEM with a magnification of 2,000,000 and a visual field size of 0.3072 square µm. The obtained image was binarized using Microsoft Office 2010, and then, using Photo Draw, the shadows of granular structure on the surface that is not a pore was removed (level 2). The image was again corrected to halftone 70 by Microsoft Office 2010 to further remove shadows.

From the corrected image, the number of pores and the each pore diameter were measured by Inspector 2.2. The ratio of pores having a pore size of 8 nm or more to all pores was calculated by dividing the number of pores having a pore diameter of 8 nm or more by the total number of pores. Regarding the ratio of the pores having a pore diameter of 8 nm or more to the total number of pores and the maximum pore diameter, the ratio and the maximum pore diameter were measured were measured for the five SEM photographs according to the above procedure, and the arithmetic mean was calculated by omitting the maximum and minimum values from the obtained five numerical values.

Long-Term Operation Stability Evaluation

Figure 2:
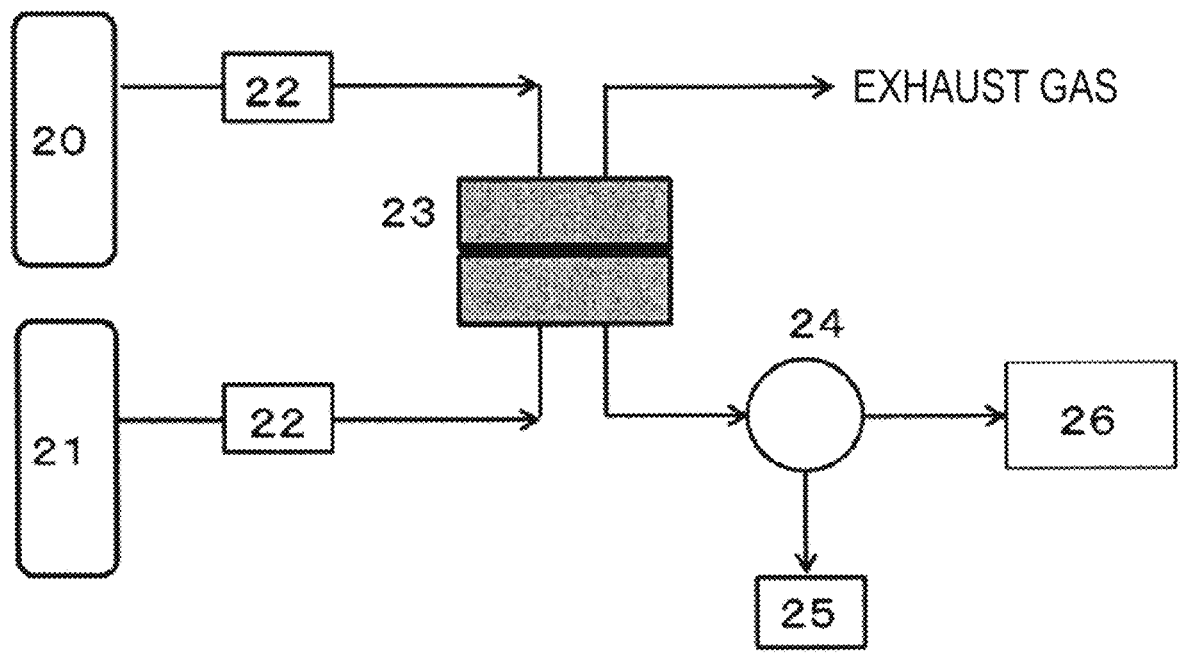
FIG. 2 is a schematic view of a device used for measuring the gas permeability of each gas separation membrane.

The evaluation of long-term operation stability of each of the gas separation membranes obtained in Examples and Comparative Examples was conducted by measuring the gas permeability with the device shown in FIG. 2, in accordance with JIS K 7126-2B.

Specifically, a permeation cell 23 in which a gas separation membrane having an effective membrane area of 25 cm$^2$ had been set to partition the cell 23 into two chambers, i.e., a feed-side cell and a permeation-side cell, was kept at a temperature of 130° C. Hydrogen and carbon dioxide were passed through the feed-side cell from a feed-gas cylinder 20 at 1 atm while controlling the flow rate of hydrogen and carbon dioxide of 7:3 and a total flow rate of 100 cm$^3$/min with a mass-flow controller 22. A sweep gas of Argon was passed through the permeation-side cell from the sweep-gas cylinder 21 at 1 atm while controlling the flow rate of 100 cm$^3$/min with the mass-flow controller 22.

A valve direction was adjusted to first send mixture of the permeation gas (i.e., hydrogen, carbon dioxide) and the sweep gas to a gas chromatograph 25 equipped with a TCD (thermal conductivity detector), and the concentration of the permeate gas in the mixture was determined. Subsequently, the valve direction was adjusted and the flow rate of the mixture of the permeate gas and the sweep gas was measured with a soap-film flow meter 26. The gas permeability was calculated from the measured flow rate and concentration. This measurement was performed every hour until a total of 90 hours. When the permeability one hour after the start of the measurement was defined as the initial permeability, the value of the $H_2$ permeability ratio, i.e., ($H_2$ permeability after 90 hours)/(initial $H_2$ permeability), is shown in Table 3.

The $H_2/CO_2$ selectivity ratio was calculated by dividing the permeability to hydrogen by the permeability to carbon dioxide. (Selectivity after 90 hours)/(Initial Selectivity) is shown in Table 3.

Measurement of $H_2/N_2$ Separation Selectivity and $H_2/CO_2$ Separation Selectivity The $H_2/N_2$ and $H_2/CO_2$ separation selectivity of each of the gas separation membranes obtained in Examples and Comparative Examples were examined for gas permeability with the device shown in FIG. 2, in accordance with JIS K 7126-2B.

Specifically, the permeation cell 23 in which a gas separation membrane having an effective membrane area of 25 cm$^2$ had been set to partition the cell 23 into two chambers, i.e., a feed-side cell and a permeation-side cell, was kept at a temperature of 80° C. Hydrogen, carbon dioxide, or nitrogen as a pure gas was passed through the feed-side cell from the feed-gas cylinder 20 at 1 atm while controlling the flow rate of 100 cm$^3$/min with a mass-flow controller 22. A sweep gas of Argon was passed through the permeation-side cell from the sweep-gas cylinder 21 at 1 atm while controlling the flow rate of 100 cm$^3$/min with the mass-flow controller 22.

The valve direction was adjusted to first send a mixture of the permeation gas (i.e., hydrogen or nitrogen) and the sweep gas to the gas chromatograph 25 equipped with a TCD (thermal conductivity detector) and the concentration of the permeate gas in the mixture was determined. Subsequently, the valve direction was adjusted and the flow rate of the mixture of the permeate gas and the sweep gas was measured with a soap-film flow meter 26. The gas permeability was calculated from the measured flow rate and concentration. This measurement was performed every 10 minutes until a total of 1 hour. The $H_2/N_2$ separation selectivity or $H_2/CO_2$ separation selectivity was calculated by dividing the permeability to hydrogen in one hour after the start of measurement by the permeability to nitrogen or carbon dioxide one hour after the start of measurement.

Polymerization Example 1

To dehydrated N-methyl-2-pyrrolidone, 2-chloroparaphenylenediamine equivalent to 100 mol %, terephthalic acid chloride equivalent to 70 mol %, and 30 mol % isophthalic chloride were added, and the mixture were polymerized by stirring for 2 hours. Thereafter, neutralization was performed with lithium carbonate and a solution of an aromatic polyamide having a polymer concentration of 10 mass % was obtained.

Polymerization Example 2

To dehydrated N-methyl-2-pyrrolidone, 2-chloroparaphenylenediamine equivalent to 30 mol % and 4,4'-diaminodiphenyl ether equivalent to 70 mol % were dissolved, and then 2-chloroterephthalic acid chloride equivalent to 100 mol % was added, and the mixture was polymerized by stirring for 2 hours. Thereafter, neutralization was performed with lithium carbonate and a solution of an aromatic polyamide having a polymer concentration of 10 mass % was obtained.

Polymerization Example 3

To dehydrated N-methyl-2-pyrrolidone, 2-chloroparaphenylenediamine equivalent to 80 mol % and 4,4'-diaminodiphenyl ether equivalent to 20 mol % were dissolved, and then 2-chloroterephthalic acid chloride equivalent to 100 mol % was added, and the mixture was polymerized by stirring for 2 hours. Thereafter, neutralization was performed with lithium carbonate and a solution of an aromatic polyamide having a polymer concentration of 10 mass % was obtained.

Comparative Example 1

DMF solution containing 16.0 wt % of a polysulfone (PSf) was cast on nonwoven polyester fabric (air permeability, 2.0 cc/cm$^2$/sec) in a thickness of 200 μm under the condition of 25° C. The coated fabric was immediately immersed in pure water and allowed to stand therein for 5 minutes, and a porous support membrane was thus produced.

In accordance with the method described in WO 2011/105278, the porous support membrane obtained by the technique described above was immersed for 2 minutes in an aqueous solution containing 6 wt % of m-phenylenediamine. Thereafter, the porous support membrane was slowly pulled up in the vertical direction, and nitrogen was blown thereagainst from an air nozzle to remove the excess aqueous solution from the surfaces of the porous support membrane.

Furthermore, a 25° C. undecane solution containing 0.16 wt % of trimesoyl chloride (TMC) was applied thereto so that the surface thereof was entirely wetted, and the coated porous support membrane was allowed to stand still for 1 minute and then held for 1 minute while keeping the surface of the porous support membrane vertical, and the excess solution was removed from the porous support membrane. This porous support membrane was allowed to stand still in a 100° C. oven for 120 seconds, rinsed with 50° C. warm water for 10 hours, and then dried in a 120° C. oven for 30 minutes, and a gas separation membrane was thus obtained.

Comparative Example 2

The porous support membrane obtained in Comparative Example 1 was immersed for 2 minutes in an aqueous solution containing 6 wt % of m-phenylenediamine. Thereafter, the porous support membrane was slowly pulled up in the vertical direction, and nitrogen was blown thereagainst from an air nozzle to remove the excess aqueous solution from the surfaces of the porous support membrane.

Furthermore, a 25° C. decane solution containing 0.16 wt % of trimesoyl chloride (TMC) was applied thereto so that the surface thereof was entirely wetted, and the coated porous support membrane was allowed to stand still for 1 minute and then held for 1 minute while keeping the surface of the porous support membrane vertical, and the excess solution was removed from the porous support membrane. This porous support membrane was allowed to stand still in a 100° C. oven for 60 seconds, rinsed with 50° C. warm water for 10 hours, and then dried in a 120° C. oven for 30 minutes, and a gas separation membrane was thus obtained.

Example 1

The NMP solution of the polyamide obtained in Polymerization Example 1 was diluted such that the content of polyamide was 6 wt %. The obtained NMP solution was cast on a polyphenylene sulfide nonwoven fabric (air permeability, 2.0 cc/cm$^2$/sec) in a thickness of 180 μm at 25° C. The coated fabric was immediately immersed in pure water and allowed to stand therein for 5 minutes, and a porous support membrane was thus produced.

The obtained porous support membrane was immersed in a 6 wt % aqueous solution of m-phenylenediamine for 2 minutes. Thereafter, the support membrane was slowly pulled up in the vertical direction, and nitrogen was blown thereagainst from an air nozzle to remove the excess aqueous solution from the surfaces of the porous support membrane.

Furthermore, a 25° C. undecane solution containing 0.16 wt % of trimesoyl chloride (TMC) was applied thereto so that the surface thereof was entirely wetted, and the coated support membrane was allowed to stand for 30 seconds. This support membrane was allowed to stand still in a 100° C. oven for 120 seconds, rinsed with 50° C. warm water for 10 hours, and then dried in a 120° C. oven for 30 minutes, and a gas separation membrane was thus obtained.

Example 2

The NMP solution of the polyamide obtained in Polymerization Example 1 was diluted such that the content of polyamide was 6 wt %. The obtained NMP solution was cast on a polyphenylene sulfide nonwoven fabric (air permeability, 2.0 cc/cm$^2$/sec) in a thickness of 180 μm at 25° C. The coated fabric was immediately immersed in pure water and allowed to stand therein for 5 minutes, and a porous support membrane was thus produced.

The obtained porous support membrane was immersed in a 6 wt % aqueous solution of m-phenylenediamine for 2 minutes. Thereafter, the support membrane was slowly pulled up in the vertical direction, and nitrogen was blown thereagainst from an air nozzle to remove the excess aqueous solution from the surfaces of the porous support membrane.

Furthermore, a 25° C. decane solution containing 0.16 wt % of trimesoyl chloride (TMC) was applied thereto so that the surface thereof was entirely wetted, and the coated support membrane was allowed to stand for 30 seconds. This support membrane was allowed to stand still in a 100° C. oven for 60 seconds, rinsed with 50° C. warm water for 10 hours, and then dried in a 120° C. oven for 30 minutes, and a gas separation membrane was thus obtained.

Example 3

The NMP solution of the polyamide obtained in Polymerization Example 2 was diluted such that the content of polyamide was 6 wt %. The obtained NMP solution was cast on a polyphenylene sulfide nonwoven fabric (air permeability, 2.0 cc/cm²/sec) in a thickness of 180 μm at 25° C. The coated fabric was immediately immersed in pure water and allowed to stand therein for 5 minutes, and a porous support membrane was thus produced.

The obtained porous support membrane was immersed in a 6 wt % aqueous solution of m-phenylenediamine for 2 minutes. Thereafter, the support membrane was slowly pulled up in the vertical direction, and nitrogen was blown thereagainst from an air nozzle to remove the excess aqueous solution from the surfaces of the porous support membrane.

Furthermore, a 25° C. undecane solution containing 0.16 wt % of trimesoyl chloride (TMC) was applied thereto so that the surface thereof was entirely wetted, and the coated support membrane was allowed to stand for 30 seconds. This support membrane was allowed to stand still in a 100° C. oven for 120 seconds, rinsed with 50° C. warm water for 10 hours, and then dried in a 120° C. oven for 30 minutes, and a gas separation membrane was thus obtained.

Example 4

The NMP solution of the polyamide obtained in Polymerization Example 2 was diluted such that the content of polyamide was 6 wt %. The obtained NMP solution was cast on a polyphenylene sulfide nonwoven fabric (air permeability, 2.0 cc/cm²/sec) in a thickness of 180 μm at 25° C. The coated fabric was immediately immersed in pure water and allowed to stand therein for 5 minutes, and a porous support membrane was thus produced.

The obtained porous support membrane was immersed in a 6 wt % aqueous solution of m-phenylenediamine for 2 minutes. Thereafter, the support membrane was slowly pulled up in the vertical direction, and nitrogen was blown thereagainst from an air nozzle to remove the excess aqueous solution from the surfaces of the porous support membrane.

Furthermore, a 25° C. decane solution containing 0.16 wt % of trimesoyl chloride (TMC) was applied thereto so that the surface thereof was entirely wetted, and the coated support membrane was allowed to stand for 30 seconds. This support membrane was allowed to stand still in a 100° C. oven for 60 seconds, rinsed with 50° C. warm water for 10 hours, and then dried in a 120° C. oven for 30 minutes, and a gas separation membrane was thus obtained.

Example 5

The NMP solution of the polyamide obtained in Polymerization Example 3 was diluted such that the content of polyamide was 6 wt %. The obtained NMP solution was cast on a polyphenylene sulfide nonwoven fabric (air permeability, 2.0 cc/cm²/sec) in a thickness of 180 μm at 25° C. The coated fabric was immediately immersed in pure water and allowed to stand therein for 5 minutes, and a porous support membrane was thus produced.

The obtained porous support membrane was immersed in a 6 wt % aqueous solution of m-phenylenediamine for 2 minutes. Thereafter, the support membrane was slowly pulled up in the vertical direction, and nitrogen was blown thereagainst from an air nozzle to remove the excess aqueous solution from the surfaces of the porous support membrane.

Furthermore, a 25° C. undecane solution containing 0.16 wt % of trimesoyl chloride (TMC) was applied thereto so that the surface thereof was entirely wetted, and the coated support membrane was allowed to stand for 30 seconds. This support membrane was allowed to stand still in a 100° C. oven for 120 seconds, rinsed with 50° C. warm water for 10 hours, and then dried in a 120° C. oven for 30 minutes, and a gas separation membrane was thus obtained.

Example 6

The NMP solution of the polyamide obtained in Polymerization Example 3 was diluted such that the content of polyamide was 6 wt %. The obtained NMP solution was cast on a polyphenylene sulfide nonwoven fabric (air permeability, 2.0 cc/cm²/sec) in a thickness of 180 μm at 25° C. The coated fabric was immediately immersed in pure water and allowed to stand therein for 5 minutes, and a porous support membrane was thus produced.

The obtained porous support membrane was immersed in a 6 wt % aqueous solution of m-phenylenediamine for 2 minutes. Thereafter, the support membrane was slowly pulled up in the vertical direction, and nitrogen was blown thereagainst from an air nozzle to remove the excess aqueous solution from the surfaces of the porous support membrane.

Furthermore, a 25° C. decane solution containing 0.16 wt % of trimesoyl chloride (TMC) was applied thereto so that the surface thereof was entirely wetted, and the coated support membrane was allowed to stand for 30 seconds. This support membrane was allowed to stand still in a 100° C. oven for 60 seconds, rinsed with 50° C. warm water for 10 hours, and then dried in a 120° C. oven for 30 minutes, and a gas separation membrane was thus obtained.

Example 7

The NMP solution of the polyamide obtained in Polymerization Example 3 was diluted such that the content of polyamide was 6 wt %, and 2-propanol was added such that the content thereof was 10 wt % of the solution. The obtained NMP solution was cast on a polyphenylene sulfide nonwoven fabric (air permeability, 2.0 cc/cm²/sec) in a thickness of 180 μm at 25° C. The coated fabric was immediately immersed in pure water and allowed to stand therein for 5 minutes, and a porous support membrane was thus produced.

The obtained porous support membrane was immersed in a 6 wt % aqueous solution of m-phenylenediamine for 2 minutes. Thereafter, the support membrane was slowly pulled up in the vertical direction, and nitrogen was blown thereagainst from an air nozzle to remove the excess aqueous solution from the surfaces of the porous support membrane.

Furthermore, a 25° C. decane solution containing 0.16 wt % of trimesoyl chloride (TMC) was applied thereto so that the surface thereof was entirely wetted, and the coated support membrane was allowed to stand for 30 seconds. This support membrane was allowed to stand still in a 100° C. oven for 60 seconds, rinsed with 50° C. warm water for 10 hours, and then dried in a 120° C. oven for 30 minutes, and a gas separation membrane was thus obtained.

Example 8

The NMP solution of the polyamide obtained in Polymerization Example 3 was diluted such that the content of polyamide was 6 wt %, and anisole was added such that the content thereof was 10 wt % of the solution. The obtained NMP solution was cast on a polyphenylene sulfide nonwoven fabric (air permeability, 2.0 cc/cm²/sec) in a thickness of 180 μm at 25° C. The coated fabric was immediately immersed in pure water and allowed to stand therein for 5 minutes, and a porous support membrane was thus produced.

The obtained porous support membrane was immersed in a 6 wt % aqueous solution of m-phenylenediamine for 2 minutes. Thereafter, the support membrane was slowly pulled up in the vertical direction, and nitrogen was blown thereagainst from an air nozzle to remove the excess aqueous solution from the surfaces of the porous support membrane.

Furthermore, a 25° C. decane solution containing 0.16 wt % of trimesoyl chloride (TMC) was applied thereto so that the surface thereof was entirely wetted, and the coated support membrane was allowed to stand for 30 seconds. This support membrane was allowed to stand still in a 100° C. oven for 60 seconds, rinsed with 50° C. warm water for 10 hours, and then dried in a 120° C. oven for 30 minutes, and a gas separation membrane was thus obtained.

Example 9

The NMP solution of the polyamide obtained in Polymerization Example 3 was diluted such that the content of polyamide was 6 wt %, and acetone was added such that the content thereof was 10 wt % of the solution. The obtained NMP solution was cast on a polyphenylene sulfide nonwoven fabric (air permeability, 2.0 cc/cm²/sec) in a thickness of 180 μm at 25° C. The coated fabric was immediately immersed in pure water and allowed to stand therein for 5 minutes, and a porous support membrane was thus produced.

The obtained porous support membrane was immersed in a 6 wt % aqueous solution of m-phenylenediamine for 2 minutes. Thereafter, the support membrane was slowly pulled up in the vertical direction, and nitrogen was blown thereagainst from an air nozzle to remove the excess aqueous solution from the surfaces of the porous support membrane.

Furthermore, a 25° C. decane solution containing 0.16 wt % of trimesoyl chloride (TMC) was applied thereto so that the surface thereof was entirely wetted, and the coated support membrane was allowed to stand for 30 seconds. This support membrane was allowed to stand still in a 100° C. oven for 60 seconds, rinsed with 50° C. warm water for 10 hours, and then dried in a 120° C. oven for 30 minutes, and a gas separation membrane was thus obtained.

Example 10

The NMP solution of the polyamide obtained in Polymerization Example 3 was diluted such that the content of polyamide was 6 wt %, and acetone was added such that the content thereof was 20 wt % of the solution. The obtained NMP solution was cast on a polyphenylene sulfide nonwoven fabric (air permeability, 2.0 cc/cm²/sec) in a thickness of 180 μm at 25° C. The coated fabric was immediately immersed in pure water and allowed to stand therein for 5 minutes, and a porous support membrane was thus produced.

The obtained porous support membrane was immersed in a 6 wt % aqueous solution of m-phenylenediamine for 2 minutes. Thereafter, the support membrane was slowly pulled up in the vertical direction, and nitrogen was blown thereagainst from an air nozzle to remove the excess aqueous solution from the surfaces of the porous support membrane.

Furthermore, a 25° C. decane solution containing 0.16 wt % of trimesoyl chloride (TMC) was applied thereto so that the surface thereof was entirely wetted, and the coated support membrane was allowed to stand for 30 seconds. This support membrane was allowed to stand still in a 100° C. oven for 60 seconds, rinsed with 50° C. warm water for 10 hours, and then dried in a 120° C. oven for 30 minutes, and a gas separation membrane was thus obtained.

Table 4 summarizes the interfacial polymerization conditions and post-treatment conditions of Examples and Comparative Examples.

TABLE 3

| | Continuous Operation Performance | | Separation Selectivity | |
|---|---|---|---|---|
| | $H_2$ Permeability Ratio (after 90 hours/ initial) | $H_2/CO_2$ Selectivity Ratio (after 90 hours/initial) | $H_2/N_2$ | $H_2/CO_2$ |
| Comparative Example 1 | 0.76 | 0.92 | 58 | — |
| Comparative Example 2 | 0.79 | 0.90 | 60 | — |
| Example 1 | 0.87 | 0.99 | 93 | — |
| Example 2 | 0.85 | 0.97 | 90 | — |
| Example 3 | 0.91 | 1.01 | 106 | — |
| Example 4 | 0.92 | 1.00 | 104 | — |
| Example 5 | 0.88 | 1.04 | 134 | 12 |
| Example 6 | 0.88 | 1.04 | 138 | 12 |
| Example 7 | 0.97 | 1.25 | 105 | 11 |
| Example 8 | 1.05 | 0.84 | 105 | 17 |
| Example 9 | 1.29 | 0.97 | 112 | 19 |
| Example 10 | 1.23 | 0.97 | 131 | 18 |

TABLE 4

| | | Support Membrane | | | | Interfacial Polymerization Conditions | | |
|---|---|---|---|---|---|---|---|---|
| | Material | Proportion of chloro group (%) | Contact angle with water (°) | Ratio of pores having pore diameter of 8 nm or more to all pores on surface (%) | Maximum pore diameter on surface (nm) | Organic Solvent | Heating Temperature (° C.) | Heating Time (min) |
| Comparative Example 1 | Polysulfone | 0% | 79° | — | — | Decane | 100 | 60 |
| Comparative Example 2 | Polysulfone | 0% | 79° | — | — | Undecane | 100 | 120 |
| Example 1 | Polymerization Example 1 | 50% | 52° | — | — | Undecane | 100 | 120 |
| Example 2 | Polymerization Example 1 | 50% | 52° | — | — | Decane | 100 | 60 |
| Example 3 | Polymerization Example 2 | 48% | 44° | — | — | Undecane | 100 | 120 |
| Example 4 | Polymerization Example 2 | 48% | 44° | — | — | Decane | 100 | 60 |
| Example 5 | Polymerization Example 3 | 81% | 49° | 17% | 14 | Undecane | 100 | 120 |
| Example 6 | Polymerization Example 3 | 81% | 49° | 17% | 14 | Decane | 100 | 60 |
| Example 7 | Polymerization Example 3 | 81% | 49° | 18% | 16 | Decane | 100 | 60 |
| Example 8 | Polymerization Example 3 | 81% | 49° | 11% | 13 | Decane | 100 | 60 |
| Example 9 | Polymerization Example 3 | 81% | 49° | 9% | 11 | Decane | 100 | 60 |
| Example 10 | Polymerization Example 3 | 81% | 49° | 5% | 11 | Decane | 100 | 60 |

As evident from the results in Table 3, when a porous support membrane containing an aromatic polyamide containing an aromatic ring substituted with a chloro group had been used, the $H_2$ permeability ratio after 90 hours was 0.85 or more and the $H_2/CO_2$ separation selectivity ratio was 0.95 or more, and the decrease in permeability and selectivity in continuous operation could be prevented as compared with the case of using a porous support membrane containing polysulfone without a chloro group. Further, the contact angle of these porous support membranes with water was 75° or less, specifically 52° or less.

Further, when an aromatic polyamide in which the ratio of the number of moles of the chloro group to the sum of the number of moles of all the aromatic rings is 80 mol % or more among the aromatic polyamide containing an aromatic ring substituted with a chloro group was used as a material of the porous support membrane, it was found that the $H_2/N_2$ selectivity was improved to 100 or more.

Furthermore, the $H_2/CO_2$ selectivity is improved when the pores having a pore diameter of 8 nm or more present on the surface of the porous support layer are 15% or more of all pores as compared to cases which are otherwise. Furthermore, the $H_2/CO_2$ selectivity was improved when the maximum pore size was 12 nm or less as compared with cases which were otherwise.

INDUSTRIAL APPLICABILITY

The gas separation membrane of the present invention are suitable for use in separation and purification of a specific gas from a mixed gas.

While the invention has been described in detail and with reference to specific embodiments thereof, it will be apparent to one skilled in the art that various changes and modifications can be made therein without departing from the spirit and scope thereof.

This application is based on based on a Japanese patent application filed on Dec. 26, 2017 (Application No. 2017-248897) and a Japanese patent application filed on Mar. 30, 2018 (Application No. 2018-67917), the contents of which are incorporated herein by reference.

REFERENCE SIGNS LIST

1: Gas separation membrane element
2: Gas-collecting pipe
3: Gas separation membrane
4: Feed-side channel member
5: Envelope membrane
6: Permeation-side channel member
7: Perforated end plate
8: Outer casing
9: Feed gas
10: Concentrated gas
11: Permeate gas
20: Feed-gas cylinder
21: Sweep-gas cylinder
22: Mass-flow controller
23: Permeation cell equipped with gas separation membrane
24: Valve
25: Gas chromatograph
26: Soap-film flow meter

The invention claimed is:
1. A gas separation membrane comprising:
a porous support membrane containing an aromatic polyamide containing an aromatic ring substituted with a chloro group; and
a separation functional layer provided on the porous support membrane and containing a crosslinked poly- amide which is a polycondensate of a polyfunctional amine and a polyfunctional acid halide,
wherein a maximum pore diameter on the surface of the porous support membrane is 12 nm or less.

2. The gas separation membrane according to claim 1, wherein the aromatic polyamide contained in the porous support membrane has a structure represented by at least one of the following formulas (1) or (2);

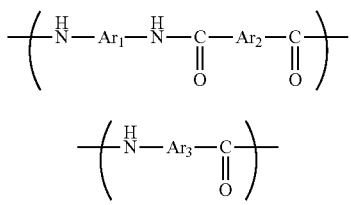

(1)

(2)

wherein,
Ar$_1$ Ar$_2$, and Ar$_3$ are each at least one group selected from the group consisting of groups represented by the following formulas (3) and (4), and
X, Y, and Z are at least one group selected from the group consisting of —O—, —CH$_2$—, —CO—, —CO$_2$—, —S—, —C(CH$_3$)$_2$—;

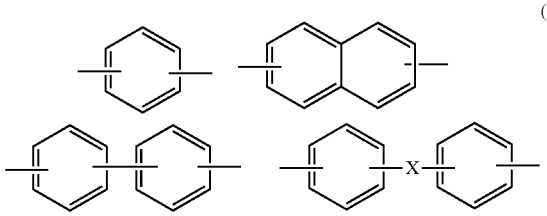

(3)

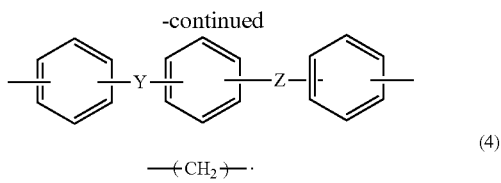

—(CH$_2$)—.

(4)

3. The gas separation membrane according to claim 2, wherein the gas separation membrane has a structure represented by the formula (3), and the substituent at least a non-aromatic ring substituent of formula (1), formula (2), X, Y and Z is bonded in a position para to another non-aromatic ring substituent.

4. The gas separation membrane according to claim 1, wherein the pores having a pore diameter of 8 nm or more are 15% or less of all pores on a surface of the porous support membrane.

5. A gas separation membrane element comprising:
a center pipe for collecting a permeate gas; and
the gas separation membrane according to claim 1, which is spirally wound around the center pipe.

6. A gas separation method using the gas separation membrane according to claim 1, comprising steps of:
(a) feeding a mixed gas containing at least one of hydrogen or helium to one surface of the gas separation membrane; and
(b) obtaining a gas having a higher concentration of at least one of hydrogen or helium than that of the mixed gas from the other surface of the gas separation membrane.

7. The gas separation method according to claim 6, wherein the mixed gas contains at least one of carbon dioxide and nitrogen.

8. The gas separation method according to claim 6, wherein the mixed gas has temperature of 80° C. or higher.

9. A method of producing gas comprising the gas separation method according to claim 6.

* * * * *